United States Patent
Gao et al.

(10) Patent No.: US 6,835,766 B1
(45) Date of Patent: Dec. 28, 2004

(54) NANOCOMPOSITES

(75) Inventors: Fengge Gao, Dunstable (GB); Barry Hull, Melton Mowbray (GB)

(73) Assignee: The Nottingham Trent University (GB)

( * ) Notice: Subject to any disclaimer, the term of this patent is extended or adjusted under 35 U.S.C. 154(b) by 177 days.

(21) Appl. No.: 10/171,812

(22) Filed: Jun. 13, 2002

(51) Int. Cl.[7] ................................................. C08K 3/34
(52) U.S. Cl. ........................................ 524/445; 524/447
(58) Field of Search ............................... 524/445, 447, 524/186

(56) References Cited

U.S. PATENT DOCUMENTS 6,387,996 B1 * 5/2002 Lan et al. ................... 524/445
6,492,452 B1 * 12/2002 Topolkaraev et al. ....... 524/445
6,569,214 B2 * 5/2003 Williams et al. .............. 51/298

OTHER PUBLICATIONS

Alexandre et al. "Polymer–layered silicte nanocomposites: preparation, properties and uses of a new class of materials," *Materials Science and Engineering.* 28(2000) pp. 1–63.
Okada et al. "Nylon 6–Clay Hybrid," *Mater. Res. Soc. Pnc.* 171 (1990) pp. 45–50.

* cited by examiner

*Primary Examiner*—Katarzyna Wyrozebski
(74) *Attorney, Agent, or Firm*—Myers Bigel Sibley & Sajovec, P.A.

(57) ABSTRACT

Polymer-clay nanocomposites are formed by compression of an intimate mixture of the polymer and the clay. The compression is carried out below the glass transition temperature for amorphous polymers or between glass transition temperature and melting point for crystalline polymers, and preferably at ambient temperature.

27 Claims, 2 Drawing Sheets

NANOCOMPOSITES

Figure 1:
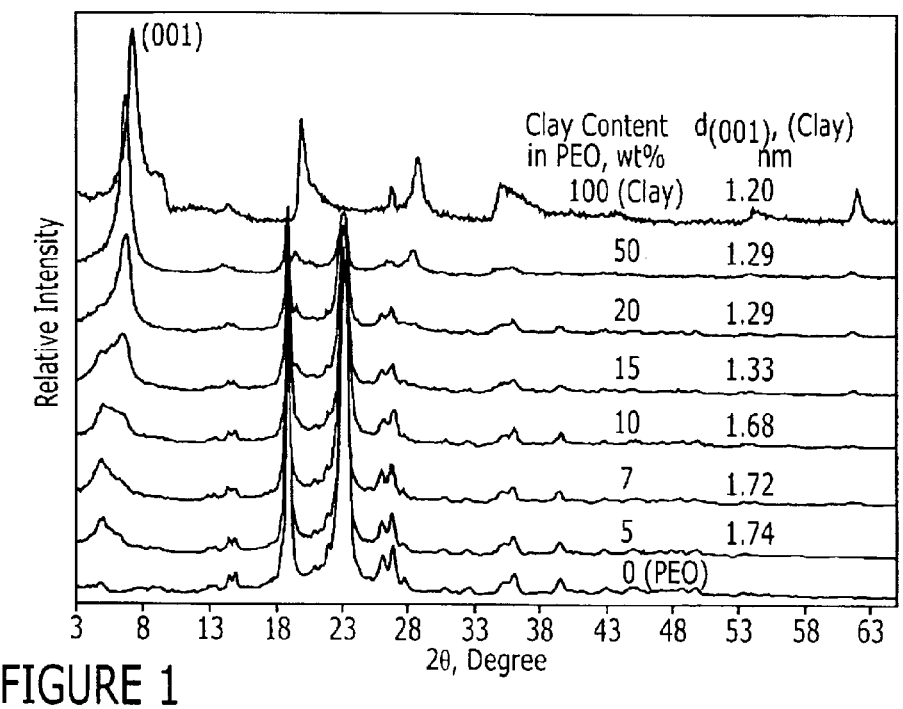

The present invention relates to nanocomposite materials (hereinafter nanocomposites), to methods of producing nanocomposites and in particular to methods of producing nanocomposites in powder form, or in a form which can easily be processed into a powder form. The invention further relates to methods of producing nanocomposites which, when the nanocomposites are added to a main polymer in a subsequent processing step, providing a product having improved properties as compared to the main polymer alone or the main polymer when simply filled with a clay or other conventional filler. The production of nanocomposites in powder form renders the method of the invention especially suitable for producing master batches of nanocomposite material for use in such subsequent processing steps.

Nanocomposites per se have been known since 1960 or before, but some of the earliest examples to receive widespread attention were described by workers at Toyota in, for example, *Mater. Res. Soc Pnc* 171 (1990) 45. These nanocomposites comprised layered silicates in nylon 6, in which the polymer penetrated between expanded layers of the clay. The method employed by the Toyota workers involved in situ polymerisation by inserting the nylon 6 precursor, ε-caprolactam between the layers of the clay, and then further expanding and dispersing the clay layers by polymerisation of the ε-caprolactam.

A review of nanocomposite materials can be found in *Materials Science and Engineering,* 28 (2000) 1–63, the contents of which are incorporated herein by reference. This review article describes the basic types of nanocomposite, that is, intercalated nanocomposites where the polymer chains are sandwiched between layers of the clay, and exfoliated (or delaminated) nanocomposites where the separated, individual, layers of the clay are more or less uniformly dispersed in the polymer matrix. The principal synthetic routes for producing nanocomposites are also described, namely, exfoliation adsorption, in situ intercalative polymerisation, melt intercalation and template synthesis.

In the exfoliation adsorption technique, the layered silicate clay is exfoliated into single layers using a suitable solvent in which the polymer (or a prepolymer) is soluble. The polymer adsorbs onto the delaminated sheet of the clay when the solvent is evaporated and the sheets re-assemble sandwiching the polymer.

In situ intercalative polymerisation requires the layered silicate clay initially to be swollen in a liquid monomer or monomer solution so that polymerisation, when initiated, occurs between the clay layers.

Melt intercalation involves mixing of the layered silicate clay with the polymer in the molten state. The polymer may then "crawl" into the interlayer space of the clay and form either an intercalated or exfoliated nanocomposite.

In template synthesis the layered silicate clays are formed in situ in an aqueous solution containing the polymer and silicate building blocks for the clay.

Thus, although various techniques are known for producing nanocomposites, each is relatively complex to a degree which limits its commercial utility, despite the markedly advantageous properties obtainable by use of the nanocomposites in subsequent polymer processing steps. It is also noted that the modified (organo-) clays which are mainly used in the formation of nanocomposites usually incorporate ammonium salts (acting as surfactants) as the modifying agent. These ammonium salt surfactant components tend to be thermally unstable and may degrade at temperatures as low as 170° C. Therefore any nanocomposite preparation methods using such modified clays which employ higher processing temperatures (such as melt intercalation) are likely to cause significant degradation of the modified clay. However, once intercalation of the polymer in the clay has occurred on formation of the nanocomposite, much better thermal stability is achieved. Therefore, it is advantageous and desirable to employ a method of nanocomposite formation which avoids elevated temperatures, and more preferably to employ a method which can be carried out at or near ambient (room) temperature, such as less than 25° C.

Accordingly, the present invention seeks to provide improved and relatively simple methods of producing polymer-clay nanocomposite materials and in particular to such methods which can be carried out at or near ambient temperature and, preferably, which provide nanocomposite materials in powder form or in a form which may be easily processed into powder form. In particular, the present invention employs compression of polymer-clay mixtures in order to achieve desired nanocomposite materials. The method of the invention can reduce the number of subsequently required processing steps and/or subsequently required processing complexity when preparing a masterbatch by producing the nanocomposite directly in powder form or in a generally solid form such as a cake which requires only simple grinding to form a powder.

The improved properties of polymer materials incorporating the nanocomposites produced by the method of the invention (as compared with the polymers alone or polymers simply filled with clay or other conventional fillers) can be one or more of mechanical, thermal and processing properties of the material and in particular, the improvements can be in one or more of stiffness (Young's modulus), toughness (stress at break) and elasticity (flexural modulus/strain at break). Other possible improvements include wear resistance, heat distortion temperature, flame retardancy, thermal stability, gas permeability and weight reduction.

Accordingly the present invention provides a method of producing polymer-clay nanocomposite materials including the steps of:

intimately mixing the polymer and the clay in powder form, and compressing the mixture to form a nanocomposite material.

The present invention is based on the surprising finding that, in appropriate mixtures and under the appropriate conditions, penetration of the polymer between the layers of the clay can be achieved simply by compression of a mixture of polymer and clay powders. The compression can be successfully carried out at ambient temperatures (eg at about 25° and below) so that heating of the polymer to a temperature above its glass transition temperature (for melting point, as appropriate) is not necessary. Also, there is no requirement to dissolve or dispense the clay, polymer, prepolymer or monomer in any sort of solvent in order to achieve the desired nanocomposite materials. Thus, the process according to the present invention is inherently simpler than prior art techniques.

In the process of the invention, the polymer and the clay are initially ground by conventional means to provide polymer and clay powders of appropriate particle size and size distribution. Typically, the powders will have a particle size of 200 mesh or less, or, for the clays 10 μm or less (eg 2 μm to 5 μm) and for the polymers, 20 μm or less. In broad terms, the clay and polymer are ground until free flowing powders are obtained. After grinding, the clay and polymer powders are mixed until an intimate clay-polymer mixture is obtained. Conventional mixing means such as a conventional blender may be used.

After mixing, a quantity of the polymer-powder mixture is placed in a suitable press and compressed until the desired nanocomposite material is obtained. The nature of the press is not crucial to the invention, and the size and type of press will be selected by the person skilled in the art in accordance with, for example, the quantity of nanocomposite which is to be produced and the pressure which is required. It is, however, important that the press provides an even pressure distribution over the entire sample. An applied pressure of as little as 5 Mpa may be sufficient to form nanocomposites from some clay-polymer mixtures. Typically, however, the polymer-clay powder mixture will be subjected to a pressure of 100 MPa or more, for example 200 MPa or more or preferably about 350 MPa. There is no theoretical maximum pressure, but clearly there is no advantage in using a pressure higher than that required in order to produce the nanocomposite. The pressure is applied by the press to the polymer-clay mixture for a suitable time interval which may be as little as about 1 minute, or may be as much as about 30 minutes. Generally, shorter compression times of about 5 minutes are sufficient, but the most suitable combination of applied pressure and duration of the compression is easily determined by the person skilled in the art for any given clay-polymer combination by simple experiment.

In principle, many combinations of clay and polymer can form a nanocomposite by the method of the present invention. In practice, some clay-polymer combinations are very unlikely to form nanocomposites (or are unlikely to form nanocomposites to an extent sufficient to make them useful in subsequent polymer processing) other than by use of fairly extreme processing conditions. It is probable, for example, that polymers which are very hard polymers such as PMMA (poly(methylmethacrylate)) will not form nanocomposite materials to a significant extent by the method of the invention. In this context, it can be noted that few common polymers achieve the hardness of PMMA. As is known in the art, certain clay/polymer combinations are not suitable for forming nanocomposites by any method because the physical properties of the clay and the polymer are incompatible.

Also, the thickness of the sample to which pressure is applied in the press can be important for the successful formation of nanocomposite materials by the method of the invention, at least for some polymer-clay combinations. As a general guideline, nanocomposite formation is more likely to occur at lower pressures if the sample is thinner whereas in some cases nanocomposite formation may not be demonstrated even with pressures as high as 600 Mpa if the sample is too thick. For example, for the combination of the clay Nanocor G105 with PEO (poly(ethylene oxide)), a nanocomposite material was formed with a sample thickness of 0.14 mm at a pressure of 5 Mpa. For the same combination of clay and polymer at a thickness of 5 mm, the desired nanocomposite was not demonstrated even at a pressure of 600 Mpa. The relationship between applied pressure, thickness and the extent or nature of nanocomposite formation is not yet well understood, but without wishing to be bound by any theory this relationship could be associated with the size distribution of the solid clay/polymer particles. Possibly some small sized particles trapped between large particles are not compressed when the thickness is high. By reducing the thickness, those smaller particles have more opportunity to be subjected to pressure. Even though the relationship between thickness, pressure and nanocomposite formation is not yet fully understood, whether a nanocomposite can be formed with a given clay-polymer combination at a particular thickness is a matter of routine experiment for the person skilled in the art.

Although in accordance with the present invention nanocomposite materials are formed by compression at ambient temperature, higher temperatures may be used. The maximum temperature used should be less than the melting point (for crystalline polymers) or glass transition temperature (for amorphous polymers) of the polymers being used (or in the case of a blend of polymers, the maximum temperature should be lower than the lowest melting point or glass transition temperature of the polymers used).

Clays may broadly be divided into two groups, that is unmodified clays such as sodium or calcium based clays which tend to be hydrophilic in nature and modified clays (or organo-clays) which tend to be organophilic in nature. Modified clays are those which have been treated to exchange cations (typically sodium) present in the clay layers with molecules having a cation group and an organophilic portion, thereby making the clay less hydrophilic and more organophilic.

Examples of unmodified (hydrophilic) clays include G-105 PGW, G-105 PGA, G-105 PGV and G-105 PGN from Nanocor, 1500 West Shure Drive, Arlington Heights, Ill. 60004, USA, Cloisite $Na^+$ from Southern Clay Products USA, SOMASIF ME-100 from CO-OP Chemical Co. Ltd Japan.

Examples of organo-modified clays include L28E and L30TC from Nanocor and Cloisiste 10A, Cloisite 15A, Cloisite 20A, Cloisite 25A, Cloisite 30B and Cloisite 93A from Southern Clay Products. These Cloisite clays are montmorillonites modified with ternary or quaternary ammonium salts.

The nature of the clay is an important factor in determining the type of polymer with which the clay will or will not interact and hence which clay/polymer combinations can be used successfully to form nanocomposite materials. As a broad generalisation, many polymers tend to be relatively organophilic/hydrophobic so that it is more likely that the polymers will interact with organoclays to form nanocomposites and less likely that such polymers will interact with hydrophilic clays to form nanocomposites. Thus, hydrophilic clays will in general interact well with hydrophilic or water solvable polymers, but will interact less well or not at all with organophilic polymers. As can be appreciated from the above, one factor in determining whether any particular clay/polymer combination will form a nanocomposite can be seen qualitatively in terms of the likely penetration of the polymer into the layers of the clay. For modified clays, the molecule having a cation group (which has been exchanged for the original clay cation) can have portions which are relatively hydrophilic and portions which are relatively hydrophobic so that organoclays can potentially promote penetration by both relatively hydrophobic and relatively hydrophilic polymers. Conversely, the hydrophilic properties of the layers of a hydrophilic clay will not promote penetration by hydrophobic/organophilic polymers because the respective polymer-clay interactions are not favourable. However, the organophilic/organophobic interactions are one aspect only of the interactions between a given clay and a given polymer, and other factors need to be considered, as will be understood by a person skilled in the art. Such factors can include, for example, the ease with which the polymer can "flow" between the clay layers.

Another such factor is the aspect ratio of the clay. The aspect ratio is a parameter of the length and thickness of the clay layers. Generally, in the present invention, clays having a higher aspect ratio are preferred. Preferred clays will have an aspect ratio of 200 or higher, up to a maximum of the order of 1500. Nanocomposites can be produced from clays having an aspect ratio of less than 200, but the improvement in the properties of the polymer/clay composite is generally insufficient. These properties can include, for example, reinforcement and strength of the composite and barrier resistance (resistance to the transmission of gases and vapours). Examples of clays having a suitable aspect ratio include montmorillonites (218) and synthetic micas (1230).

In accordance with the invention, the clay-polymer blends may be selected from a wide composition range. Preferably, the clay/polymer blend will include at least 1%, more preferably at least 2%, and possibly at least 5% by weight of the clay. Typically, a maximum amount of clay will be about 80%, since amounts of clay in excess of 80% are unlikely to lead to any significant improvement in properties.

After formation of the nanocomposite by compression in accordance with the invention, a compressed body of material is obtained. The body of nanocomposite material may then be further processed by conventional means, for example an initial grinding step to form a nanocomposite powder masterbatch for use in product forming steps, such as by suitable moulding techniques.

The following examples and comparative example are illustrative of the invention.

EXAMPLE 1

Nanocomposites of poly (ethylene oxide) (a crystalline polymer) and a sodium based montmorillonite clay (G-105 from Nanocor) were prepared by blending powders of the polymer and the clay and compressing 0.1 g of the mixture in a mould at 330 Mpa pressure and ambient temperature thereby to produce 19-mm diameter 0.40 mm thickness disks. The resulting material was analysed by x-ray diffractometry (XRD) using a Phillips diffractometer and the results are shown in FIG. 1 for various relative quantities of clay and polymer. From FIG. 1, consideration of the (001) peaks shows that these peaks have shifted to lower angles for all the clay/polymer combinations. The angle of the (001) peak is related to the interlayer spacing of the clay and the reduction in angle shown in FIG. 1 shows that in the clay-polymer composites, the inter-layer spacing is increased. The increase is most significant for amounts of clay of 10% and below. For example, FIG. 1 shows that for 5% of the clay, the interlayer spacing is increased to 1.74 mm, as compared to 1.20 mm for 100% clay.

EXAMPLE 2

Figure 2:
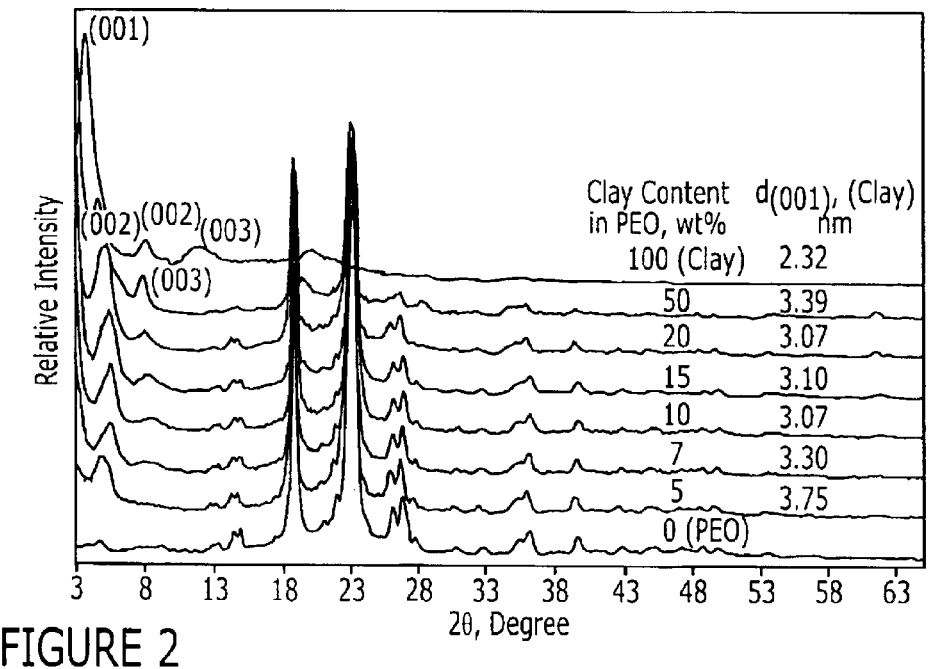

Nanocomposites of poly(ethylene oxide) and an organo-clay (I-28 from Nanocor, an ammonium ion exchanged montmorillonite clay), were prepared using the same method as in Example 1 and the results of the XRD analysis of the resulting materials are shown in FIG. 2. In considering FIG. 2, it can be seen that the (001) peaks have been shifted to values of 2θ below 3 degrees, which is the measurement limit of the XRD equipment. However, the (002) peaks are clear and the interlayer distance has been calculated from these peaks. FIG. 2 shows that layer expansion of the clay also occurs with the organo-clay-PEO combination. However, in this case the interlayer spacing is broadly independent of the clay content.

EXAMPLE 3

Figure 4:
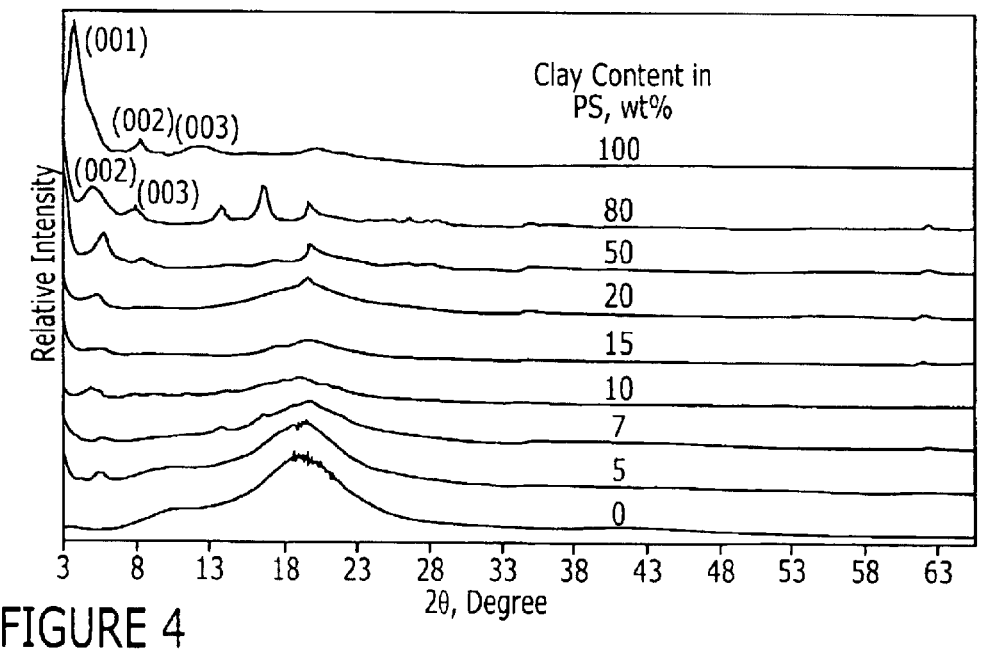

Nanocomposites of polystyrene (an amorphous polymer) and an organo-clay (I-28 from Nanocor) were prepared using the same method as in Example 1 and the results of the XRD analysis of the resulting materials are shown in FIG. 4.

From FIG. 4 it can be seen that the interlayer distance is increased from 2.32 mm for 100% clay to around 3.5 mm for the clay/polymer composites, indicating that the polymer has penetrated between the clay layers forming a nanocomposite material.

COMPARATIVE EXAMPLE 1

Figure 3:
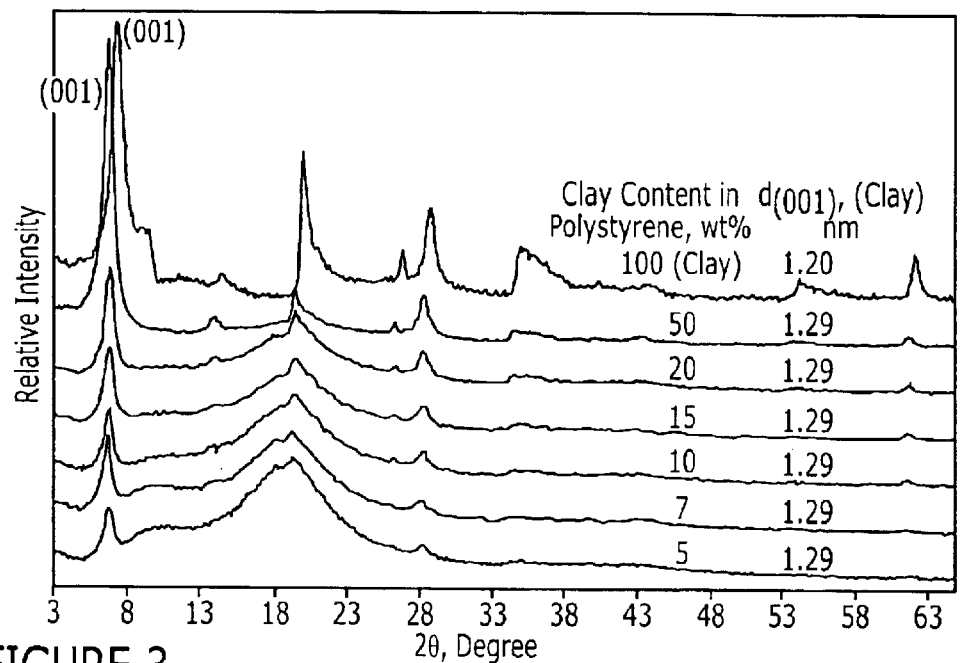

Composites of polystyrene and a sodium based montmorillonite clay (G-105 from Nanocor) were prepared using the same method as in Example 1 and the results of the XRD analysis of the resulting materials are shown in FIG. 3. It can be seen from FIG. 3 that no significant increase in the interlayer spacing of the clay has occurred, indicating that nanocomposite materials have not been formed. This is, however, to be expected and nanocomposites of the materials would not be expected to be formed by methods known in the art either. This may be attributed to incompatibility of the polystyrene and the sodium based montmorillonite clay. Polystyrene is a brittle amorphous polymer with a relatively high glass transition temperature and hence exhibits very limited flow properties which in turn limits its ability to "flow" into the interlayer spacing of the clay. The consideration is reinforced by the hydrophobic nature of the polystyrene as compared with the relatively hydrophilic nature of the clay.

In contrast, the combination of the organo-clay and polystyrene in Example 3 does result in the formation of nanocomposite materials. Without wishing to be bound by theory, it is believed that the interactions between the clay and the polymer in Example 3 are more favourable in that, as with the polystyrene, the organo-clay is more hydrophobic. Also, to further the flow of the polymer into the interlayer spacing of the clay, interactions between the polymer and the hydrocarbon ammonium ions pre-inserted between the layers of the organo clay may occur, so that the relatively brittle polystyrene may be "dissolved" and integrated into a soft phase with the hydrocarbon ammonium ion phase, this soft phase then being capable of flowing into the clay interlayer spacing.

What is claimed is:

1. A method of producing polymer-clay nanocomposite materials comprising the steps of:
   (i) intimately mixing the polymer and the clay in powder form; and
   (ii) compressing the mixture at a temperature below the glass transition temperature or melting point of the polymer to form a nanocomposite material.

2. A method as claimed in claim 1 wherein the compression step is carried out at ambient temperature.

3. A method as claimed in claim 1 wherein the compression step is carried out at about 15° C. to 25° C.

4. A method as claimed in claim 1 wherein the compression step the polymer-clay mixture is subjected to a pressure of at least 5 MPa.

5. A method as claimed in claim 4 wherein the polymer-clay mixture is subjected to a pressure of about 100 MPa.

6. A method as claimed in claim 4 wherein the polymer-clay mixture is subjected to a pressure of about 200 MPa.

7. A method as claimed in claim 4 wherein the polymer-clay mixture is subjected to a pressure of about 350 MPa.

8. A method as claimed in claim 1 wherein the duration of the compression step is from about 1 minute to about 30 minutes.

9. A method as claimed in claim 8 wherein the duration of the compression step is from about 2 minutes to about 10 minutes.

10. A method as claimed in claim 1 including, before the mixing step, the step of milling or grinding the clay to a particle size of 10 μm or less.

11. A method as claimed in claim 1 including, before the mixing step, the step of milling or grinding the polymer to a particle size of 20 μm or less.

12. A method as claimed in claim 1 wherein the aspect ratio of the polymer is at least 200.

13. A method as claimed in claim 1 wherein the aspect ratio of the polymer is not more than 1500.

14. A method as claimed in claim 1 wherein the clay is a relatively hydrophilic clay.

15. A method as claimed in claim 14 wherein the clay is selected from the group comprising unmodified montmorillonite clays and synthetic micas.

16. A method as claimed in claim 14 wherein the polymer is a generally water solvable polymer or hydrophilic polymer.

17. A method as claimed in claim 16 wherein the polymer is selected from the group comprising polyethylene oxide, polyvinyl pyrrolidone and polyols.

18. A method as claimed in claim 1 wherein the polymer is a generally water solvable polymer or hydrophilic polymer.

19. A method as claimed in claim 18 wherein the polymer is selected from the group comprising polyethylene oxide, polyvinyl pyrrolidone and polyols.

20. A method as claimed in claim 1 wherein the clay is a relatively hydrophobic clay.

21. A method as claimed in claim 20 wherein the clay is selected from the group comprising organo-modified montmorillonite clays and synthetic micas.

22. A method as claimed in claim 20 wherein the polymer is a generally hydrophobic polymer.

23. A method as claimed in claim 20 wherein the polymer is a generally water solvable polymer or hydrophilic polymer.

24. A method as claimed in claim 20 wherein the polymer is selected from the group comprising polystyrene, polyethylene oxide, polyvinyl pyrrolidone, polyols, nylon-6, nylon-66, nylon-12, maleic anhydride grafted polypropylene, maleic anhydride grafted polyethylene, polyacrylonitrile and polyethylene terphthalate.

25. A method as claimed in claim 1 wherein the intimate mixture comprises at least 1% of the clay by weight.

26. A method as claimed in claim 1 wherein the intimate mixture comprises at least 2% by weight of the clay.

27. A method as claimed in claim 1 wherein the intimate mixture comprises not more than 80% by weight of the clay.

* * * * *